Sept. 1, 1925.
E. BOWERS
1,552,381
VEHICLE CUSHION
Filed June 7, 1924      2 Sheets-Sheet 1
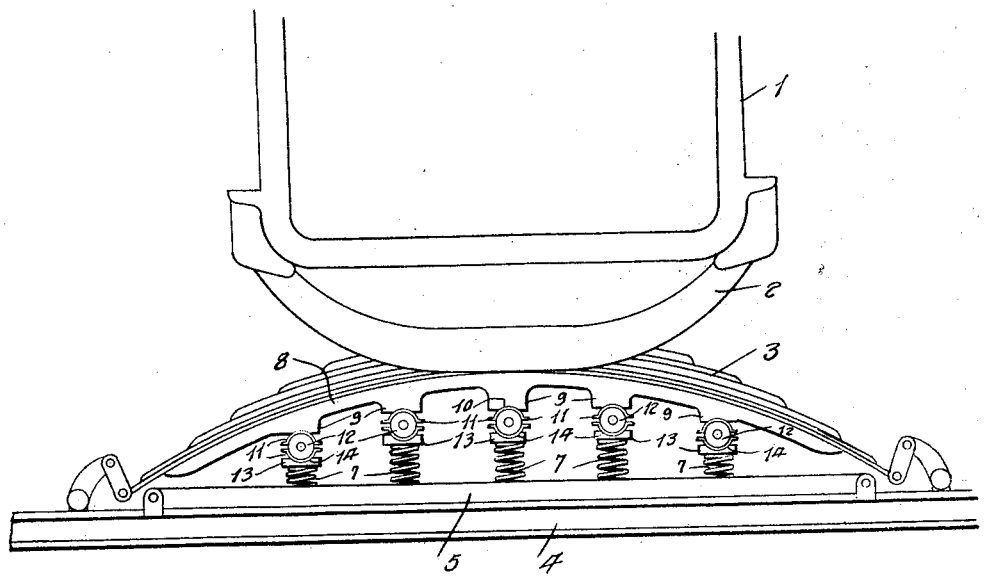
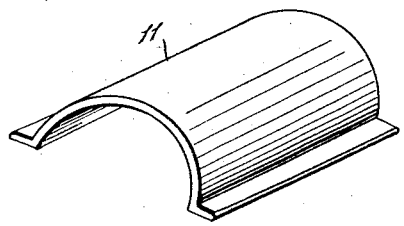
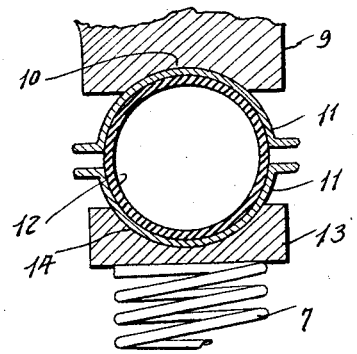
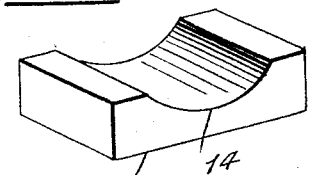
Inventor
E. Bowers,
By
Attorney Sept. 1, 1925.
E. BOWERS
VEHICLE CUSHION
Filed June 7, 1924
1,552,381
2 Sheets-Sheet 2
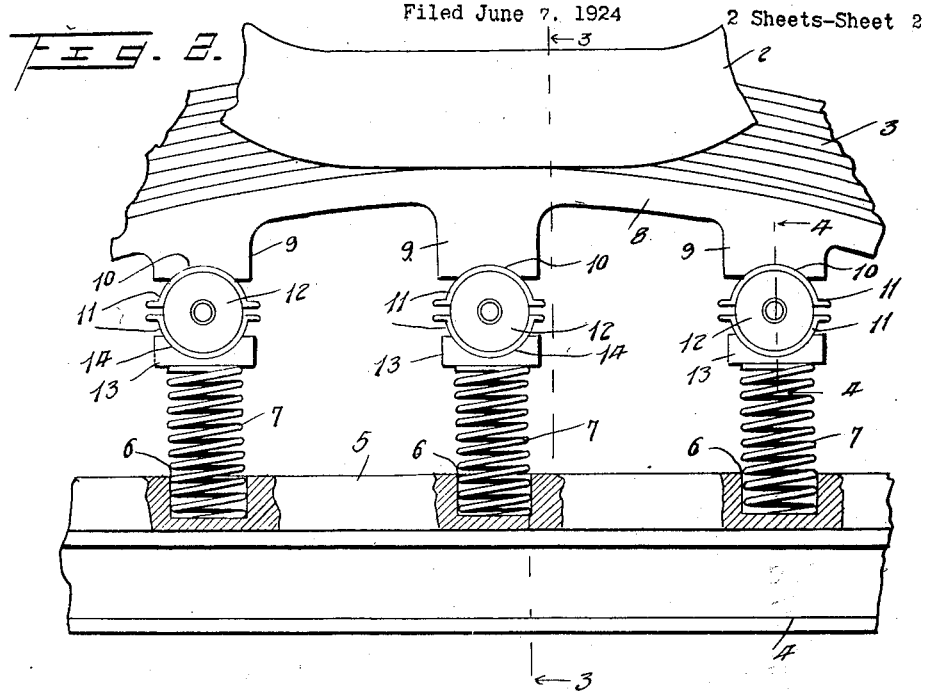
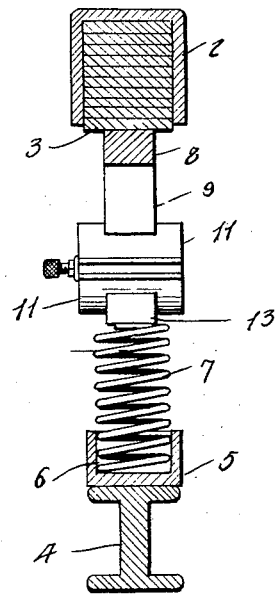
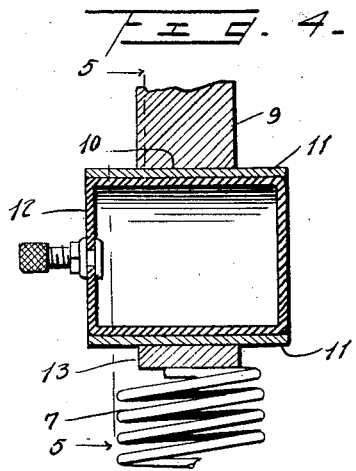
Inventor
E. Bowers.
By
Attorney Patented Sept. 1, 1925.

1,552,381

UNITED STATES PATENT OFFICE.

EDWARD BOWERS, OF PADUCAH, KENTUCKY.

VEHICLE CUSHION.

Application filed June 7, 1924. Serial No. 718,576.

*To all whom it may concern:*

Be it known that I, EDWARD BOWERS, a citizen of the United States, residing at Paducah, in the county of McCracken and State of Kentucky, have invented certain new and useful Improvements in Vehicle Cushions; and I do hereby declare the following to a full, clear, and exact description of the invention, such as will enable others skilled in the art to which it appertains to make and use the same.

The object of this invention is the provision of novel means for yieldably supporting a vehicle body whereby to neutralize shock and vibration and materially add to the comforts of the occupants of a vehicle particularly when traversing rough roads.

The invention contemplates spaced sets of yieldable means interposed between the axle of a vehicle and the body, each set comprising a pneumatic element and a spring element, said elements being placed one upon the other and having the axis of one at a right angle to the axis of the other.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a detail view showing the application of the invention;

Figure 2 is an enlarged view of a portion of the parts illustrated in Figure 1;

Figure 3 is a detail sectional view on the line 3—3 of Figure 2;

Figure 4 is an enlarged detail sectional view on the line 4—4 of Figure 2;

Figure 5 is a sectional view on the line 5—5 of Figure 4;

Figure 6 is a detail perspective view of one of the saddles for the pneumatic cushion; and Figure 7 is a detail perspective view of one of the seats mounted upon the spring element and receiving the saddle of the pneumatic cushion.

Corresponding and like parts are referred to in the following description and designated in the several views of the drawings by like reference characters.

The numeral 1 designates the body portion of a vehicle, 2 a cross bar or bolster, 3 a vehicle spring, and 4 an axle. These parts may be of any preferred construction and are illustrated to demonstrate the application of the invention.

In accordance with the invention, a support 5 is placed upon the axle 4 and is provided in its top side with recesses 6 in which are fitted the lower ends of helical springs 7. The support 5 partakes of the nature of a bar and may be secured to the axle 4 in any preferred way. A member 8 is placed against the under side of the spring 3 and is provided at intervals in length with bosses or depending projections 9 which are recessed in their lower faces as indicated at 10 to receive saddles 11 of cushioning elements 12. A block 13 is mounted upon each of the helical springs 7 and is recessed in its top side as indicated at 14 to receive a saddle 11. The blocks 13 constitute seats in which the pneumatic cushioning elements are fitted. Each of the cushion elements 12 consists of a ball or sack, which is adapted to be inflated and expanded whereby to provide a yieldable or cushioning element to supplement and act fluently with the companion helical spring 7. The cushioning elements are provided in sets or pairs and one element of a pair is pneumatic and the companion elements consist of a spring and these co-acting elements are disposed with the axis of one at a right angle to the axis of the other.

The cushioning elements may supplement the action of the ordinary vehicle springs or may be used independently thereof and in practice absorb shock and vibration and cushion the action so that the occupants of a vehicle may ride in comfort. The invention is designed for vehicles of every description and for toy wagons and the component parts may be of any relative size and preferred construction best adapted for the particular use.

What is claimed is:—

1. In combination with an axle and its bolster spring, a rigid element disposed against the spring, and cushioning members in spaced relation lengthwise of said element engaging said element and the axle, said cushioning members each comprising a helical spring and a cylindrical inflatable member arranged longitudinally of one another and with their axes at right angles to each other.

2. In combination with an axle and its bolster spring, a rigid element disposed against the spring, cushioning members in spaced relation lengthwise of said element engaging said element and the axle, said cushioning members comprising spring devices and cylindrical cushion members disposed with their longitudinal axes at a right angle to the devices, and said rigid element having notches accommodating said cylindrical cushion members.

3. In combination with an axle and its bolster spring, a rigid element disposed against the spring, cushioning members in spaced relation lengthwise of said element engaging said element and the axle, said cushioning members comprising spring devices and cylindrical cushion members disposed with their longitudinal axes at a right angle to the devices, and said rigid element having notches accommodating said cylindrical cushion members, blocks on the spring devices, said blocks having notches to receive the said cylindrical cushion members.

4. In combination with an axle and its bolster spring, a rigid element disposed against the spring, cushioning members in spaced relation lengthwise of said element engaging said element and the axle, said cushioning members comprising spring devices and cylindrical cushion members disposed with their longitudinal axes at a right angle to the devices, and said rigid element having notches accommodating said cylindrical cushion members, blocks on the spring devices, said blocks having notches to receive the said cylindrical cushion members, and arcuate saddles disposed partly around said cylindrical cushion members and directly seated in the said notches of the rigid element and of the blocks.

In testimony whereof I affix my signature.

EDWARD BOWERS.